(12) United States Patent  (10) Patent No.: US 7,191,590 B2
Nagaoka et al.  (45) Date of Patent: Mar. 20, 2007

(54) EXHAUST GAS PURIFYING METHOD AND EXHAUST GAS PURIFYING SYSTEM

(75) Inventors: Daiji Nagaoka, Fujisawa (JP); Masashi Gabe, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/981,636

(22) Filed: Nov. 5, 2004

(65) Prior Publication Data

US 2005/0132698 A1  Jun. 23, 2005

(30) Foreign Application Priority Data

Dec. 19, 2003  (JP) ............................. 2003-422752

(51) Int. Cl.
*F01N 3/00* (2006.01)
(52) U.S. Cl. ............................ 60/285; 60/274; 60/276; 60/277
(58) Field of Classification Search ................ 60/274, 60/276, 277, 285, 286, 295
See application file for complete search history.

(56) References Cited

U.S. PATENT DOCUMENTS

| | | | | |
|---|---|---|---|---|
| 5,473,890 | A * | 12/1995 | Takeshima et al. ........... | 60/285 |
| 5,771,685 | A | 6/1998 | Hepburn | |
| 5,832,722 | A | 11/1998 | Cullen et al. | |
| 6,058,700 | A * | 5/2000 | Yamashita et al. ............ | 60/285 |
| 6,272,848 | B1 * | 8/2001 | Okude et al. .................. | 60/274 |
| 6,481,199 | B1 | 11/2002 | Bidner et al. | |
| 6,497,092 | B1 * | 12/2002 | Theis ............................ | 60/274 |
| 6,574,955 | B2 * | 6/2003 | Schroder et al. .............. | 60/295 |
| 6,637,189 | B1 * | 10/2003 | Boegner et al. ............... | 60/274 |
| 6,637,198 | B2 * | 10/2003 | Hertzberg ..................... | 60/295 |
| 6,871,492 | B2 * | 3/2005 | Huynh et al. .................. | 60/295 |
| 2002/0152741 | A1 | 10/2002 | Bidner et al. | |
| 2004/0074226 | A1 * | 4/2004 | Tanaka .......................... | 60/277 |
| 2004/0112042 | A1 * | 6/2004 | Hoffmann et al. ............. | 60/274 |
| 2006/0010854 | A1 * | 1/2006 | Nakano et al. ................ | 60/285 |

FOREIGN PATENT DOCUMENTS

| | | |
|---|---|---|
| DE | 19851564 A1 | 5/2000 |
| EP | 0869263 A1 | 10/1998 |
| EP | 1273337 A1 | 1/2003 |
| EP | 1491736 A1 | 12/2004 |
| JP | 2000-145438 | 5/2000 |
| WO | WO 03/083273 | 10/2003 |

OTHER PUBLICATIONS

EP Search Report for corresponding EP Application No. 04105561.7-2113 dated Apr. 5, 2005.

* cited by examiner

*Primary Examiner*—Tu M. Nguyen
(74) *Attorney, Agent, or Firm*—Staas & Halsey LLP (57) ABSTRACT

In an exhaust gas purifying system (b 1) that purifies NOx for the exhaust gas from an internal combustion engine (E) through sulfur purging control by a NOx occlusion reduction type catalyst (41), sulfur purging is judged to have started when the oxygen concentration (Co) detected by an oxygen concentration detector (54) disposed downstream of the NOx occlusion reduction type catalyst (41) drops from a first predetermined oxygen concentration indicating that the NOx discharge condition to a second predetermined oxygen concentration indicating that NOx discharge has ended and that Sox discharge has started. Accordingly, during sulfur purging control by the NOx occlusion reduction type catalyst (41), consideration is given to the discharge of NOx without sulfur purging at the start of sulfur purging control; furthermore, this timing is judged by monitoring the concentration of oxygen downstream of the NOx occlusion reduction type catalyst (41), thus optimizing sulfur purging control.

8 Claims, 5 Drawing Sheets

EXHAUST GAS PURIFYING METHOD AND EXHAUST GAS PURIFYING SYSTEM

BACKGROUND OF THE INVENTION

The present invention relates to exhaust gas purifying methods and exhaust gas purifying systems aiming to optimize the start and stop timing of sulfur purging control for the resolution of sulfur poisoning of NOx occlusion reduction type catalysts.

A wide range of research projects and proposals have dealt with the removing of particulate matter (PM) and nitrogen oxides (NOx) from the exhaust gasses generated by automobile internal combustion engines, mounted internal combustion engines, and the like, thus creating cleaner exhaust gasses. With regard to the purifying of NOx from exhaust gasses from automobiles and the like in particular, NOx occlusion reduction type catalysts, three way catalysts, and other NOx purifying catalysts are being used.

These NOx occlusion reduction type catalysts are formed from monolithic catalysts and the like. Furthermore, these NOx occlusion reduction type catalysts are formed by providing a catalyst coat layer to alumina, titanium oxide, and other supporting bodies, and by then supporting NOx occluding materials (or substances) such as platinum and other noble metal catalysts or barium on this catalytic coating layer. NOx can subsequently be purifying from the exhaust gas by occlusion when this gas is in a condition with a high oxygen concentration (i.e., a lean air-fuel ratio state). In addition, when there is little or no oxygen in the exhaust gas (i.e., a rich air-fuel ratio state), the release of NOx to the environment can be prevented by discharge the occluded NOx and reducing the discharged NOx at the same time.

However, sulfur contained in the fuel adheres to the NOx occluding material in the case of this type of NOx occlusion reduction type catalyst, causing the NOx occluded quantity and purifying ratio to drop and resulting in the problem of sulfur poisoning. This sulfur content is adsorbed into the NOx occluding material as $Ba_2SO_4$ (barium sulfate) or some other sulfate. Accordingly, CO (carbon monoxide) is replaced with $SO_2$ (sulfur dioxide) in the $Ba_2SO_4$ in oxygen-less and high temperature conditions, and the sulfur content is discharged as $SO_2$. It is, therefore, necessary as detailed, for example, in Japanese Patent Laid-Open 2000-145438 to regularly control sulfur purging by setting the oxygen concentration low and by raising the temperature of the exhaust gas to a sulfur purging temperature in excess of the catalyst's regeneration temperature or above.

The specifics of this sulfur-purging control vary with respect to catalyst; however, sulfur purging is generally carried out in a rich environment with the catalyst temperature raised to above 600° C. to 650° C. In order to achieve these conditions in the case of diesel engines, exhaust gas volume reduction is carried out by intake throttling, large-volume EGR, and the like and post injection is carried out. In this way, the air-fuel ratio of exhaust gas flowing into the catalyst becomes rich as its temperature is increased. In addition, the HC (hydrocarbons) and other compounds contained in the exhaust gas are combusted through the catalyst's oxidation action, and the heat produced by this active oxidation reaction causes the temperature of the catalyst to increase further. Accordingly, sulfur purging is accelerated.

As the temperature of the catalyst is increased for this sulfur purging control, there is a danger that heat deterioration will occur if the duration of the process is too long. Accordingly, it is crucial that sulfur purging control be carried out for the minimum necessary time. In addition, if the duration of sulfur purging control after the start of actual sulfur purging is too short, it may not proceed to completion. In such a case, sulfur poisoning will advance and the efficiency of NOx purifying ratio will drop. As a result, accurate judgment of the start time for sulfur purging is extremely important.

Furthermore, sulfur purging control performed for a preset time as determined from experimental results and the like is problematic in that it lacks the ability to compensate for changes in the catalyst over time.

Nevertheless, as $SO_2$ sensors capable of being used in mass production engines do not currently exist, it is not possible to judge the start of sulfur purging or the sulfur purging volume, or to accurately predict the start and end timing of sulfur purging, the period to be required, and the like.

Through experiment and the like, however, the inventors of the present invention have gotten the following information with regard to sulfur purging control.

Figure 4:
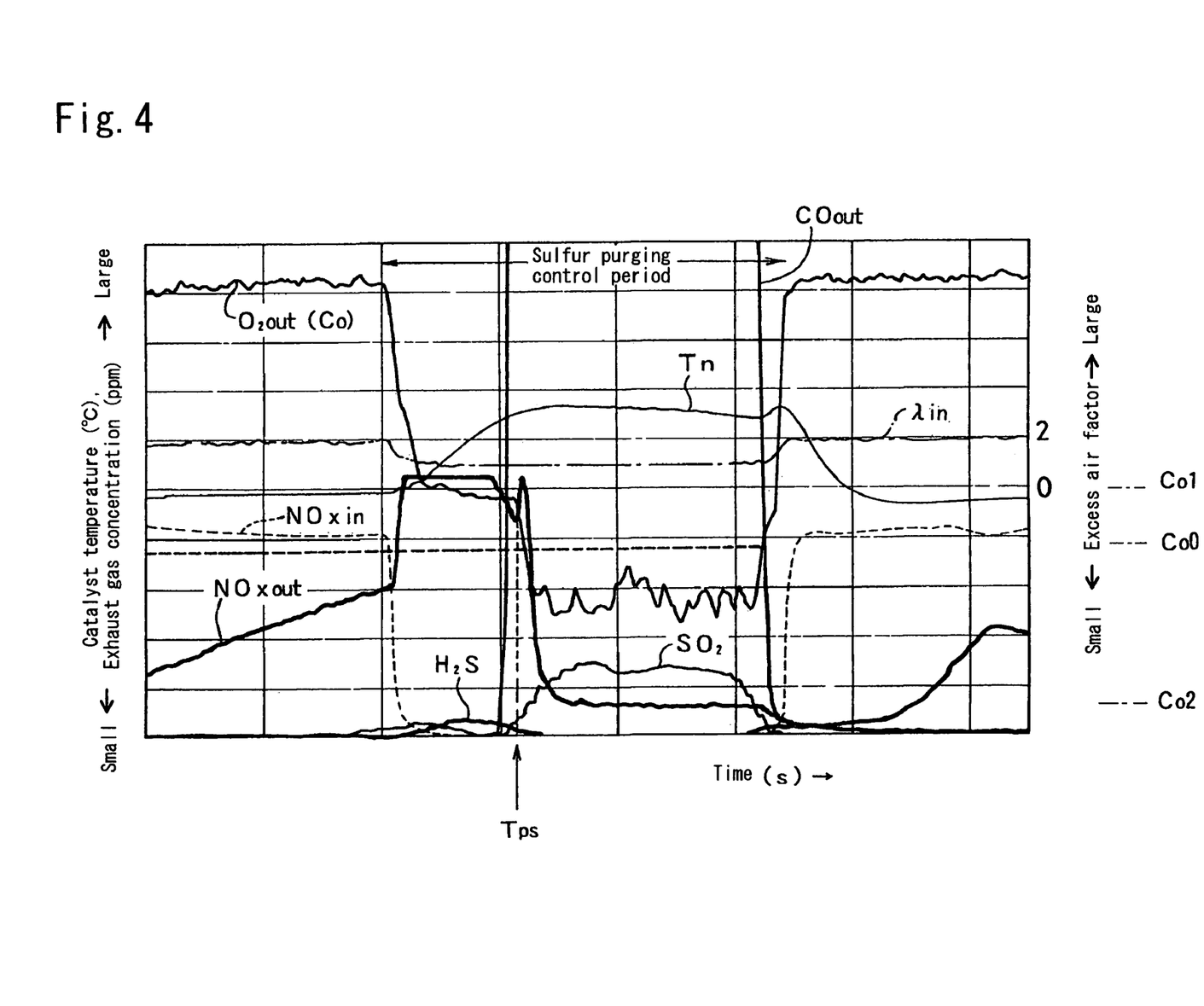
FIG. 4 shows the time series of exhaust gas concentration with respect to time during sulfur purging control.

As shown in FIG. 4, when sulfur purging control is carried out, nitrogen dioxide ($NO_2$) is initially discharged from the NOx occluding material and active oxygen is generated. Following this, the $NO_2$ is reduced by the catalytic action and the oxygen concentration in the exhaust gas is increased. Accordingly, sulfur discharge becomes no longer possible. When the discharge of $SO_2$ from the NOx occluding material and its reduction are close to ending, the oxygen concentration in the exhaust gas drops, and simultaneously, the excess CO begins to slip (i.e., discharge to the flow path downstream of the catalyst). At this time, sulfur purging and the discharge of $SO_2$ also start. Accordingly, by monitoring the oxygen concentration downstream of the catalyst, it is possible to judge the timing of the start of $SO_2$ discharge during sulfur purging based on the change in the oxygen concentration.

Figure 3:
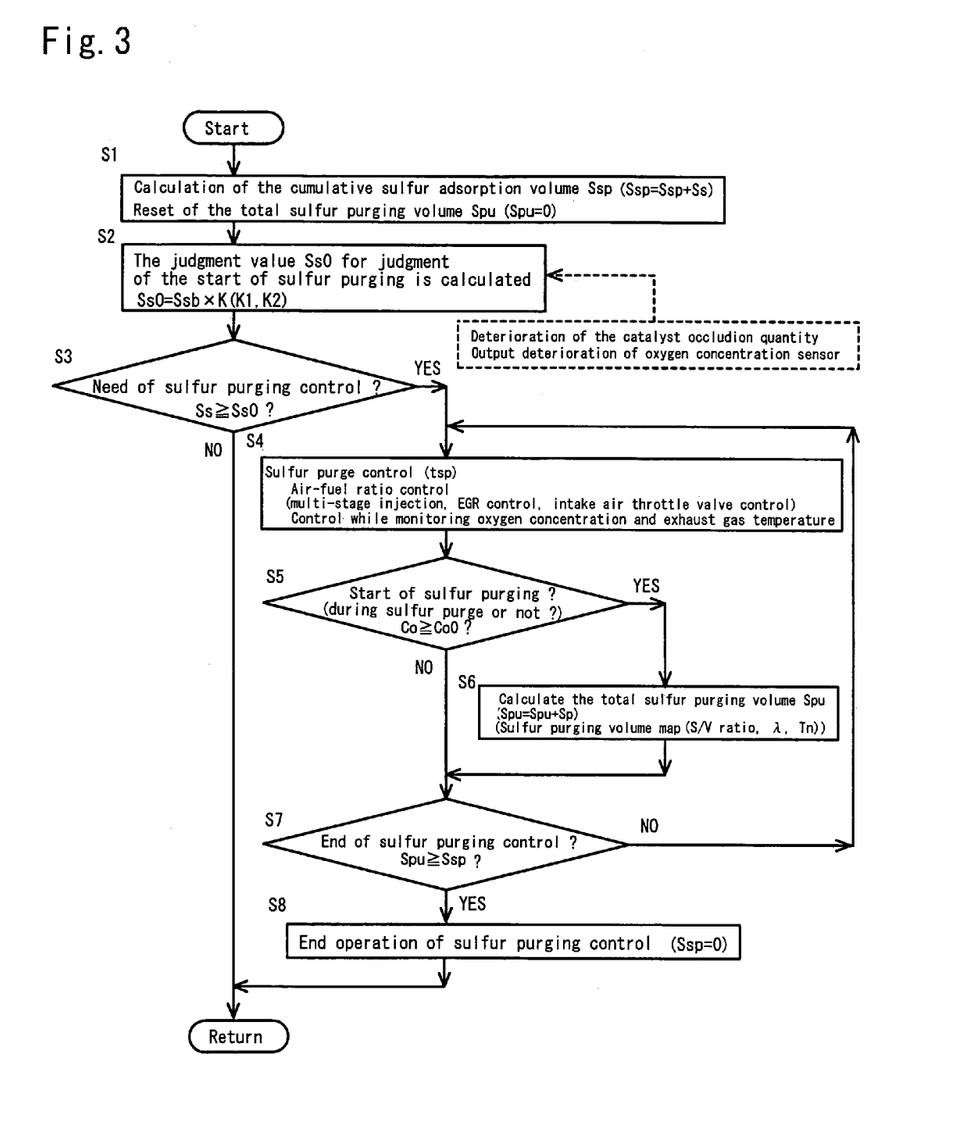
FIG. 3 shows an example of sulfur purging control flow according to an embodiment of the present invention.
Figure 5:
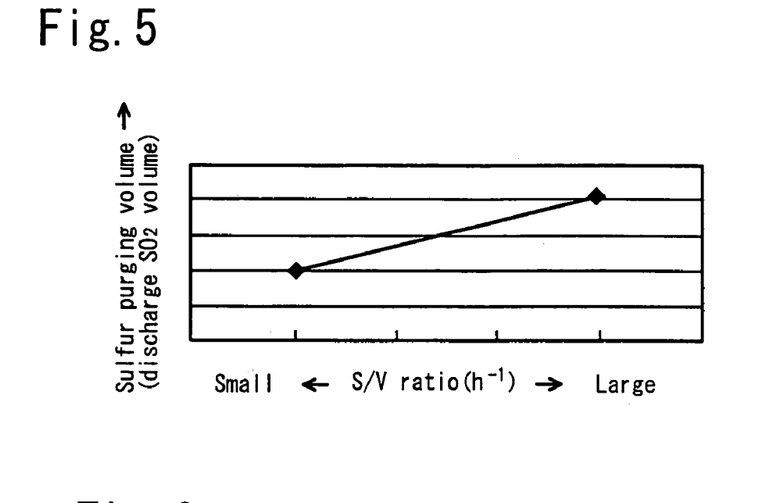
FIG. 5 shows the relationship between sulfur purging volume and S/V ratio.

In addition, as shown in FIG. 3 through FIG. 5, the sulfur purging volume during this sulfur purging control—in other words, the $SO_2$ discharge volume—increases as the S/V ratio (i.e., flow rate/vessel volume)—in other words, the speed of passage of the exhaust gas—grows larger. Sulfur purging is not possible at an oxygen concentration of 0% or higher, and in this extremely rich condition, the volume of CO discharged from the engine is high. Consequently, as the air-fuel ratio during sulfur purging control decreases—in other words, as it is deeper in rich condition—the sulfur purging volume increases. In addition, the higher the temperature of the catalyst during sulfur purging control is, the higher the sulfur purging volume is. Accordingly, by monitoring SAT ratio, air-fuel ratio, and catalyst temperature as parameters, it is possible to accurately estimate the volume of sulfur purging during sulfur purging control.

BRIEF SUMMARY OF THE INVENTION

The purpose of this invention is to provide an exhaust gas purifying method and an exhaust gas purifying system capable of judging the start timing of actual sulfur purging and optimizing the sulfur purging control duration during sulfur purging control of NOx occlusion reduction type catalysts. Consideration is given to the discharge of NOx without sulfur purging at the start of sulfur purging control, and this timing is judged by monitoring the concentration of oxygen downstream of the NOx occlusion reduction type catalyst.

The exhaust gas purifying method for achieving the above-mentioned aim provides a NOx occlusion reduction type catalyst occluding NOx in the discharging as well as reducing lean state and discharging NOx in the rich state; furthermore, when it is judged that sulfur purging of the NOx occlusion reduction type catalyst is necessary, an exhaust gas purifying system for internal combustion engines performs sulfur purging control by making the air-fuel ratio of the exhaust gas flowing in the NOx occlusion reduction type catalyst richer than that of the normal driving state of internal combustion engines, and in the above sulfur purging control, the exhaust gas purifying method judges that sulfur purging has started when the oxygen concentration detected by an oxygen concentration detection means disposed downstream of the NOx occlusion reduction type catalyst drops from a first predetermined oxygen concentration indicating that the NOx is discharging to a second predetermined oxygen concentration indicating that NOx discharge has ended and indicating that SOx discharge has started. This method allows the timing of the actual start of sulfur purging to be accurately detected.

In addition, the above-described exhaust gas purifying method is configured such that, following the start of sulfur purging control, the start of sulfur purging is judged to have occurred when the oxygen concentration detected by the oxygen concentration detection means disposed downstream of the NOx occlusion reduction type catalyst drops below a predetermined judgment value (or threshold). As a result of this method, a simple algorithm can detect the start of sulfur purging.

The exhaust gas purifying method is further configured such that, during sulfur purging control, calculation of the volume of sulfur purged as a result of sulfur purging control is started at the point in time at which sulfur purging is judged to have started, the purged sulfur volumes are summed to find the total sulfur purging volume, and sulfur purging control is terminated in accordance with the result of comparison of the total sulfur purging volume with a target purging volume. The cumulative sulfur adsorption volume as summed prior to the start of sulfur purging control can be used as this target purging volume. As a result of this method, the amount of time required for sulfur purging control can be minimized.

In addition, in the above-described exhaust gas purifying method, the volumes of sulfur purged as a result of sulfur purging control are converted into map data or functional equations using S/V ratio, air-fuel ratio or excess air factor, and catalyst temperature as parameters, and based on data input in advance, the volume of sulfur to be purged can be calculated using the S/V ratio, air-fuel ratio or excess air factor, and catalyst temperature measured during sulfur purging control. This method allows more accurate calculation of the volume of sulfur to be purged.

The aforementioned S/V is also referred to as the spatial velocity, and with S/V $(h^{-1})$=gas flow rate (l/h)/catalyst volume (1), it indicates the per-unit gas flow volume. In terms of the relationship between air-fuel ratio (A/F) and excess air factor ($\lambda$), excess air factor=supply air-fuel ratio/theoretical air-fuel ratio.

In terms of the exhaust gas purifying system for achieving the above-mentioned aim, an exhaust gas purifying system for internal combustion engines provides a NOx occlusion reduction type catalyst occluding NOx in the lean state and discharging as well as reducing NOx in the rich state and a control device performing, when it is judged that sulfur purging of the NOx occlusion reduction type catalyst is necessary, sulfur purging control by making the air-fuel ratio of the exhaust gas flowing in the NOx occlusion reduction type catalyst richer than that of the normal driving state of internal combustion engines; furthermore, in addition to providing an oxygen concentration sensor downstream of the NOx occlusion reduction type catalyst, this system is configured such that, when the above sulfur purge control is being carried out, the above control device judges that sulfur purging has started when the oxygen concentration detected by the oxygen concentration sensor drops from a first predetermined oxygen concentration indicating that the NOx is discharging to a second predetermined oxygen concentration indicating that NOx discharge has ended and indicating that SOx discharge has started. This configuration allows the timing of the actual start of sulfur purging to be accurately detected.

In addition, in the above-described exhaust gas purifying system, the control device is configured such that, following the start of sulfur purging control, the start of sulfur purging is judged to have occurred when the oxygen concentration detected by the oxygen concentration detection means disposed downstream of the NOx occlusion reduction type catalyst drops below a predetermined judgment value (or threshold). As a result of this configuration, a simple algorithm can detect the start of sulfur purging.

In the exhaust gas purifying system, the control device is further configured such that, during sulfur purging control, the total sulfur purging volume, which is a sum of the sulfur purged volume by the above sulfur purging control that have started summation following judgment of the start of sulfur purging is compared with a target purging volume, and the sulfur purging control is terminated. The cumulative sulfur adsorption volume and the like that are summed prior to the start of sulfur purging control can be used as this target sulfur purging volume. As a result of this configuration, the amount of time required for sulfur purging control can be minimized.

In addition, the control device of the above-described exhaust gas purifying system is configured such that the volumes of sulfur purged as a result of sulfur purging control are converted into map data or functional equations using S/V ratio, air-fuel ratio or an excess air factor, and catalyst temperature as parameters, and based on data input in advance, the volume of sulfur to be purged can be calculated using the S/V ratio, air-fuel ratio or excess air factor, and catalyst temperature measured at the time of the above sulfur purging control. This system allows more accurate calculation of the volume of sulfur to be purged.

With the exhaust gas purifying method and exhaust gas purifying system according to the present invention, it is possible to judge the start of actual sulfur purging during sulfur purging control, and in addition, by measuring a range of parameters, it is possible to accurately calculate changing sulfur purging volumes that change over time, thus allowing accurate sulfur purging control in accordance with the cumulative sulfur adsorption volume from prior to the start of sulfur purging. Accordingly, heat aging of the catalyst can be minimized while avoiding any reduction in NOx removal efficiency occurring as a result of sulfur poisoning.

Furthermore, the start timing of actual sulfur purging is detected not using a preset time of sulfur purging control but from oxygen concentration, and the end of sulfur purging is detected through the comparison of the total sulfur purging volume with the cumulative sulfur adsorption volume; accordingly, sufficient sulfur purging capable of also responding suitably to variations in the concentration of sulfur in fuel can be achieved. In addition, the present invention can also compensate for variations in NOx occluding ability occurring due to changes in the catalyst over time.

DETAILED DESCRIPTION OF THE INVENTION

Hereinafter, the preferred embodiments of the exhaust gas purifying system according to the present invention will be described with reference to the accompanying drawings.

Figure 1:
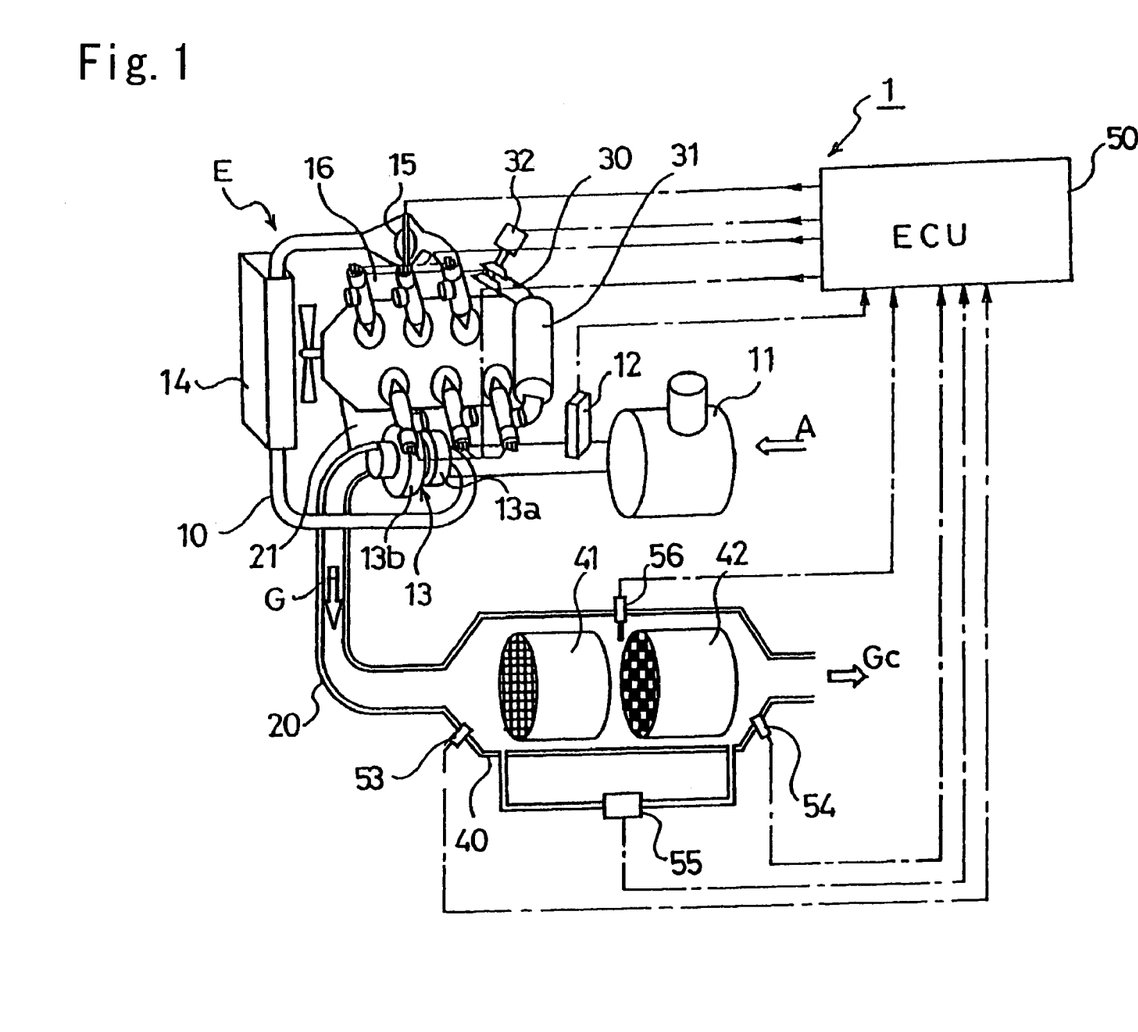
FIG. 1 shows the configuration of an exhaust gas purifying system according to an embodiment of the present invention.

FIG. 1 shows the configuration of an exhaust gas purifying system 1 according to the present invention.

This exhaust gas purifying system 1 comprises an exhaust gas purifying device 40 having an upstream NOx occlusion reduction type catalyst 41 and a downstream DPF 42.

Furthermore, the NOx occlusion reduction type catalyst 41 is formed from a monolithic catalyst. In addition, a catalytic metal capable of oxidizing NOx and a NOx occluding material capable of occluding NOx are supported on the porous catalytic coating layer of alumina ($Al_2O_3$) and the like.

The porous catalytic coating layer comprises alumina ($Al_2O_3$) or the like, and the catalytic metal is formed of platinum (Pt) or the like. Furthermore, the NOx occluding material comprises an alkaline metal such as sodium (Na), potassium (K), or cesium (Cs); an alkaline earth metal such as calcium (Ca) or barium (Ba); a rare earth metal such as yttrium (Y) or lanthanum (La); or a combination of a multiplicity thereof.

In this NOx occlusion reduction type catalyst 41 and under exhaust gas conditions wherein the concentration of oxygen is high (i.e., lean air-fuel ratio state), as in the normal operating state of a diesel engine or a lean-burn gasoline engine or the like, discharged NO (nitrogen oxide) is oxidized by the oxidation function of the catalytic metal using the $O_2$ (oxygen) contained in the exhaust gas, thus creating $NO_2$ (nitrogen dioxide); furthermore, this $NO_2$ is occluded in the NOx occluding material in the form of a chloride. As a result of this process, the exhaust gas is purified.

However, as a result of continuous occlusion of NOx, barium and other NOx occluding materials are changed into nitrate salts, gradually saturating and losing the ability to occluding $NO_2$. As a result, it becomes necessary for NOx occluded when the air-fuel ratio of the exhaust gas was lean to be discharged before NOx purification ability is saturated. Accordingly, the engine's operating conditions are modified to perform over-rich combustion, producing exhaust gas at a high exhaust gas temperature, with a low oxygen concentration, and with a high carbon monoxide concentration (i.e., rich spike gas), and delivering this rich spike gas to the catalyst.

With this exhaust gas in a rich/air-fuel ratio state, the NOx occluding material that occluded and changed it to nitrate salts discharges the occluded $NO_2$ and returns to the original barium or the like. Since no $O_2$ is present in the exhaust gas, the discharged $NO_2$ is reduced on the catalytic metal with CO, HC (hydrocarbons), and $H_2$ (hydrogen) contained in the exhaust gas being used as reducer. Subsequently, the $NO_2$ is purified by conversion to $N_2$ (nitrogen), $H_2O$ (water), and $CO_2$ (carbon dioxide).

In the DPF 42, furthermore, can be formed from a monolith-honeycomb wall-flow type filter with its inlets and exits of channels (or cells) in a porous ceramic honeycomb with a checkered pattern of alternating opened and closed cells principally or from a felt-type filter with randomly layered inorganic fibers of aluminum or the like. Accordingly, the DPF 42 gathers PM from the exhaust gas.

A first exhaust gas concentration sensor 53 and a second exhaust gas concentration sensor 54, each integrating a $\lambda$ (excess air factor) sensor, NOx concentration sensor, and oxygen concentration sensor, are disposed in front of and behind the exhaust gas purifying device 40. These sensors 53, 54 detect the oxygen concentration for monitoring during sulfur purging control, volume of occluded sulfur, for monitoring during sulfur purging control, the excess air factor (or air-fuel ratio) for calculation of the volume of the purged sulfur, and the NOx concentration for calculation of the NOx purifying ratio. In terms of the relationship between air-fuel ratio (A/F) and excess air factor ($\lambda$), excess air factor=supply air-fuel ratio/theoretical air-fuel ratio.

In order to estimate the PM deposition quantity, furthermore, a pressure difference sensor 55 detecting the difference pressure $\Delta P$ between the front and the rear of the DPF is disposed on a connecting pipe connected in front of and behind the exhaust gas purifying device 40. In addition, in order to measure the temperature of both the NOx occlusion reduction type catalyst 41 and the DPF 42, a temperature sensor 56 is disposed at the approximate center of the exhaust gas purifying device 40.

The output values from the above-described sensors are input to an engine control unit (ECU) 50 performing recovery control of the NOx purification ability of the NOx occlusion reduction type catalyst 41 and regenerative control of the DPF 42 in addition to overall control of operation of the engine E. Furthermore, a common-rail electronic-control fuel injection device for fuel injection into the engine E, a throttle valve 15, an EGR valve 32, and the like are controlled using the control signals output from the control device 50.

In addition, the detection values for NOx concentration CNOx1 and CNOx2 from the first exhaust gas concentration sensor 53 and a second exhaust gas concentration sensor 54 respectively are used to calculate the NOx purifying ratio RNOx (i.e., 1.0−CNOx2/CNOx1) in this control device 50. Further, the PM cumulative quantity volume for the DPF 42 is estimated using the pressure difference $\Delta P$ detected by the pressure difference sensor 55.

In this exhaust gas purifying system 1, intake air enters the cylinder from an intake manifold 16 via an air cleaner 11 of an intake passage 10, a mass air flow (MAF) sensor 12, a compressor 13a of a turbo-charger 13, and an inter-cooler 14. The volume of air A is regulated by the intake throttle valve 15.

Moving from an exhaust manifold 21 via an exhaust gas passage 20, the exhaust gas G generated inside the cylinder drives a turbine 13b of the turbo-charger 13 of an exhaust passage 20 from an exhaust manifold 21 and passes through the exhaust gas purifying device 40 and a silencer (not shown) before being discharged to the environment. The exhaust gas G is converted into purified exhaust gas Gc by the exhaust gas purifying device 40. Furthermore, EGR gas constituting a portion of the exhaust gas G is re-circulated to the intake manifold 16 via an EGR cooler 31 and an EGR valve 32 of an EGR passage 30. The volume of EGR gas is regulated by the EGR valve 32.

Figure 2:
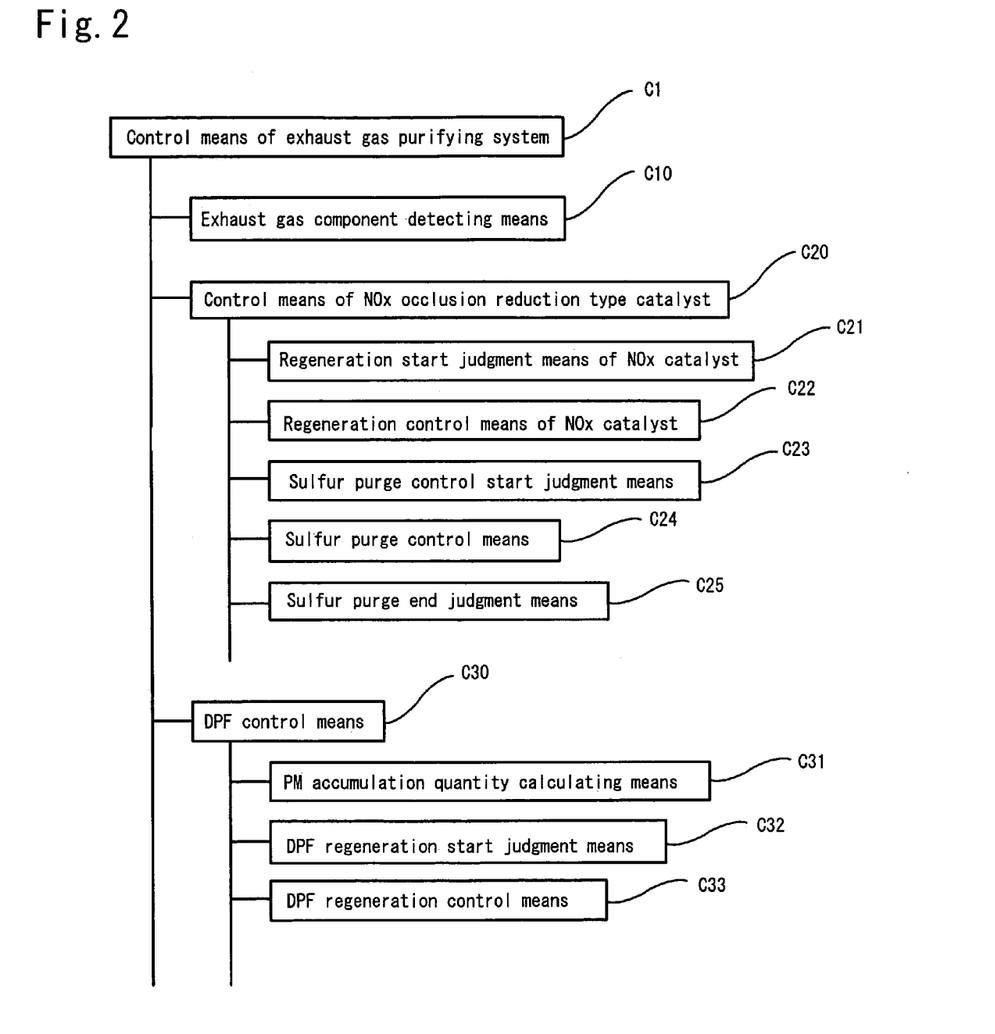
FIG. 2 shows the configuration of the control means for the exhaust gas purifying system according to an embodiment of the present invention.

The control device of the exhaust gas purifying system 1 is integrated into the control device 50 of the engine E. In addition to controlling operation of the engine E, this control device 50 controls the exhaust gas purifying system 1. As shown in FIG. 2, this control device of the exhaust gas purifying system 1 provides and comprises a control means C1 for the exhaust gas purifying system having an exhaust gas constituent detection means C10, a control means C20 for the NOx occlusion reduction type catalyst, and a control means C30 for the DPF, and the like.

Comprising the first exhaust gas concentration sensor 53 and a second exhaust gas concentration sensor 54, and the like, this exhaust-gas constituent detection means C10 is a means for detecting the oxygen concentration (or the excess air factor λ)and NOx concentration of the exhaust gas.

The NOx occlusion reduction type catalyst control means C20 constitutes a means for controlling regeneration, sulfur purging, of the NOx occlusion reduction type catalyst 41, and comprises a regeneration start judgment means C21 for the NOx catalyst, a regeneration controlling means C22 for the NOx catalyst, a sulfur purging start judgment means C23, a sulfur purging control means C24, a sulfur purging end judgment means C25.

Hereinafter the operation of the NOx occlusion reduction type catalyst control means C20 is described. Using the regeneration start judgment means C21 for the NOx catalyst, the NOx purifying ratio RNOx is calculated from the NOx concentration detected by the exhaust gas constituent detection means C10, and it is judged that the regeneration of the NOx catalyst is to be started when this NOx purifying ratio RNOx is lower than a predetermined judgment value (or threshold). After judgment of the start of regeneration, the exhaust gas is set to a predetermined rich air-fuel ratio state condition and to within a predetermined temperature range by the regeneration controlling means C22 for the NOx catalyst using post injection during fuel injection control for the engine E, EGR control, intake air throttle valve control, restoring NOx purification ability (in other words, NOx occlusion ability) and performing NOx catalyst regeneration. Although this temperature range is dependent on the catalyst in question, it is generally between 200° C. and 600° C. Furthermore, as explained in detail hereinafter, sulfur purging is carried out using the sulfur purging start judgment means C23, sulfur purging control means C24, and sulfur purging end judgment means C25.

In addition, the DPF control means C30 comprises a PM cumulative quantity calculation means C31, a DPF regeneration start judgment means C32, and a DPF regeneration control means C33, and the like.

This DPF control means C30 operates as follows. Using the PM occlusion volume calculation means C31, the PM occlusion volume of the DPF 42 is calculated from the pressure difference ΔP detected by the pressure difference sensor 55. Next, the DPF regeneration start judgment means C32 is used to judge whether the clogging of the DPF 42 is in excess of a predetermined clogging by observing whether the cumulative PM occlusion volume is in excess of a predetermined judgment value (or threshold). When the start of DPF regeneration is judged, the DPF regeneration control means C33 raises the exhaust gas temperature using post injection and EGR control and the like, and the regeneration of the DPF 42 starts.

In this exhaust gas purifying system 1, the exhaust gas purifying method for NOx occlusion reduction type catalysts in accordance with the present invention operates using a control flow for sulfur purging similar to that illustrated in FIG. 3. The control sequence illustrated in FIG. 3 is a control sequence relating to sulfur purging of the NOx occlusion reduction type catalyst 41, and together with a control sequence relating to the regeneration of NOx occlusion ability, this control sequence is called in a repetitive fashion from the control sequence for the entire exhaust gas purifying device to judge whether sulfur purging control is needed, and if needed, the control sequence performs sulfur purging control.

When this control sequence is started, the cumulative sulfur adsorption volume Ssp is calculated as follows by the sulfur purging start judgment means C23 in Step S1. First of all, the engine-discharge sulfur volume is calculated based on the fuel consumption volume and the sulfur volume contained in the fuel (i.e., using actual market values for sulfur concentration, and the like.). Next, the engine-discharge sulfur volume is multiplied by an adsorption coefficient using the catalyst temperature Tn as a parameter to give the sulfur adsorption volume Ss occluded in the NOx occlusion reduction type catalyst 41. These values are then summed to calculate the cumulative sulfur adsorption volume Ssp. Furthermore, the total sulfur purging volume Spu is reset (i.e. Spu=0) in Step S1.

In the subsequent Step S2, the judgment value (or threshold) Ss0 for judgment of the start of sulfur purging is calculated. This judgment value (or threshold) Ss0 is obtained by correcting a preset value Ssb for judgment of the start of sulfur purging through multiplication by a correction value K for threshold calculation. This correction value K for threshold calculation is a function of a primary correction value K1 taking into consideration deterioration of the NOx occluded quantity as determined from the NOx purifying ratio and a secondary correction value K2 determined based on deterioration of the oxygen concentration sensor; furthermore, the correction value K can be calculated from the primary correction value K1 and the secondary correction value K2 using a map data and the like already containing values obtained through testing on the like in advance.

In other words, the start of sulfur purging control must occur before any drop in NOx purifying ratio as a result of the balance between the catalyst's NOx occluded quantity and sulfur adsorption volume. Accordingly, the start of sulfur purging control is carried out in accordance with a preset standard start-timing map. In practice, degradation of the catalyst varies as a result of differences in the actual values for the sulfur concentration of commercially available diesel oil and in driving states; therefore, the required timing for the start of sulfur purging control changes, depending on the differences in NOx occluding ability caused by the differences in the catalyst's deterioration. It is, therefore, necessary to correct the start timing.

For this reason, the NOx concentration and oxygen concentration are monitored. In addition, a standard map of degradation in NOx purifying ratio with respect to distance traveled is made available, and when the various actual values deviate from the standard values obtained from this standard map, correction of the start timing for sulfur purging control is carried out. Although NOx purifying ratio is calculated using the NOx concentration as measured in front of and behind the catalyst, it is also acceptable for an estimate to be calculated using the NOx concentration measured on the downstream side of the catalyst and the engine discharge NOx value (i.e., a map value).

Furthermore, in the subsequent Step S3, a decision is made regarding the need for sulfur purging control using the sulfur purging start judgment means C23. This judgment judges that sulfur purging control is necessary when the cumulative sulfur adsorption volume Ssp becomes larger than the judgment value (or threshold) Ss0 for judgment of the start of sulfur purging.

If it is judged by judgment from Step S3 that sulfur purging control is not required, the sequence proceeds to [Return] without performing this procedure. Furthermore, the sequence proceeds to Step S4 in situations where sulfur purging control is judged to be necessary.

In the sulfur purging control of Step S4, multi-stage injection of the engine's fuel injection comprising, pilot injection and post injection is carried out, and in addition, EGR control and intake control are implemented. Next, the volume of fuel used for multi-stage injection is adjusted while monitoring the temperatures and the like detected using the temperature sensor 56, and feedback control is carried out to ensure that the temperature of the exhaust gas flowing into the NOx occlusion reduction type catalyst 41 is higher than the temperature necessary for sulfur purging (i.e., approximately 600° C. to 650° C.). This raising of the exhaust gas temperature results in an increase in the temperature of the NOx occlusion reduction type catalyst 41. HC (hydrocarbons) and other compounds contained in the exhaust gas and delivered to multi-stage injection via the exhaust gas passages are combusted through the catalyst's oxidation action; accordingly, the heat produced by this active oxidation reaction causes the temperature of the catalyst to increase further.

In addition, the oxygen concentration Cin (or excess air factor kin) detected by the first exhaust gas concentration sensor 53, or in other words, the oxygen concentration of the exhaust gas flowing into the NOx occlusion reduction type catalyst 41 Cin (or excess air factor $\lambda$in), is monitored, and multi-stage injection control, EGR control intake air control are implemented in a feedback-type manner to make this concentration equal to a predetermined oxygen concentration Cit (or excess air factor $\lambda$it).

The control target represented by the predetermined oxygen concentration Cit (or excess air factor $\lambda$it) is set to a rich air-fuel ratio (theoretical air-fuel ratio); however, it is preferable for this to be set to the stoichiometric air-fuel ratio. Through this air-fuel ratio control, the exhaust gas flowing into the NOx occlusion reduction type catalyst 41 is set to a rich air-fuel ratio; however, it is preferable for this to be set to the stoichiometric air-fuel ratio. As a result, sulfur purging is carried out efficiently.

Subsequently, this sulfur purging control is carried out for a predetermined time tdpf (e.g., 2 to 60 seconds). This predetermined time tdpf is related to the interval for checking the timing of actual sulfur purging start or the timing of the end of sulfur purging control, and in addition, it is set in advance. Furthermore, it is acceptable for this sulfur purging control to modify the values of the target exhaust temperature and of the target air-fuel ratio before and after judgment of the start of actual sulfur purging. As a result of this, efficiency can be improved and heat degradation of the catalyst can be prevented in a more effective manner.

Judgment of the start of sulfur purging is carried out next in Step S5. Judgment of this start of sulfur purging occurs when the oxygen concentration Co measured by the second exhaust gas concentration sensor 54 disposed downstream of the NOx occlusion reduction type catalyst 41 leaves the stoichiometric range and drops to the predetermined judgment value (or threshold) Co0 or lower.

The predetermined judgment value (or threshold) Co0 is used to determine the timing of transition from a relatively high oxygen concentration condition (with a first predetermined oxygen concentration Co1; 0.5% to 0.2%) arising from discharge and reduction of the initial $NO_2$ of sulfur purging control to a low oxygen concentration (with a second predetermined oxygen concentration Co2: 0.1% to 0.0%) where $NO_2$ discharge and reduction at the latter stages of sulfur purging control is almost complete; furthermore, this is set to between approximately 0.2% and 0.1%.

Next, when it is judged in Step S5 that sulfur purging has started, the sulfur purging volume Sp is calculated in Step S6, and these values are accumulated to give the total sulfur purging volume Spu. Furthermore, the sequence proceeds to Step 7 in situations where sulfur purging is judged not to have started.

Calculation of the sulfur purging volume Sp is carried out based on map data plotting the sulfur purging volume with respect to the parameters of S/V ratio, rich depth (and excess air factor $\lambda$ (or air-fuel ratio)), and catalyst temperature as prepared in advance from measurement values and the S/V ratio, excess air factor $\lambda$in (or air-fuel ratio), and catalyst temperature Tn, and the like, calculated from measurement values.

In Step S7, a judgment is made regarding whether or not sulfur purging has ended. Specifically, it is judged whether or not the total sulfur purging volume Spu set to an initial value of zero in Step S1 and other steps and calculated in Step S6 has risen above the cumulative sulfur adsorption volume Ssp (or a predetermined limit value Ssp0). If the total sulfur purging volume Spu is not in excess of the cumulative sulfur adsorption volume Ssp, it is judged that sulfur purging has not ended, and the sequence returns to Step S4. Subsequently, sulfur purging control is carried out in Step S4 until this level is exceeded.

After a predetermined duration tDPF of sulfur purging control in situations where the sequence returns to Step S4, the sequence proceeds to Step S5 and Step S7 is repeated. Accordingly, steps from Step S4 through Step S7 are repeated until sulfur purging has completed, and at the point of completion, the sequence proceeds to Step S8.

In situations where it has been judged in Step S5 that sulfur purging has started, judgment in each subsequent Step S5 judges whether or not sulfur purging is in progress. In this control sequence, the same method is used for judgment of the start of sulfur purging and judgment of whether or not sulfur purging is in progress; accordingly, both are performed in Step S5.

In situations where the total sulfur purging volume Spu is in excess of the cumulative sulfur adsorption volume Ssp, it is judged that sulfur purging has ended, the sequence proceeds to Step S8, and completion processing for sulfur purging control is carried out. Specifically, ending of air-fuel ratio control during sulfur purging control, resetting of the cumulative sulfur adsorption volume (Ssp=0) and the like, constitute completion processing for sulfur purging control.

In accordance with the exhaust gas purifying method and exhaust gas purifying system 1 configured as explained above, after the start of sulfur purging control, the actual start of sulfur purging Tps during sulfur purging control can be judged as illustrated in FIG. 4 when the oxygen concentration Co detected by the second exhaust gas concentration sensor 54 disposed downstream of the NOx occlusion reduction type catalyst 42 reaches a predetermined judgment value (or threshold) and Co0 or lower. In other words, when the oxygen concentration Co has dropped from a first predetermined oxygen concentration Co1 indicating that NOx is in a state of discharge to a second predetermined oxygen concentration Co2 indicating that NOx discharge has ended and SOx discharge has started, it is possible to judge the start of sulfur purging Tps.

During sulfur purging control, furthermore, calculation of the sulfur volume Sp purged by sulfur purging control is started at the time Tps at which sulfur purging is judged to have started. The total sulfur purging volume Spu is determined through summation of the purged sulfur content Sp. The total sulfur purging volume Spu and the cumulative sulfur adsorption volume Ss (and the target sulfur purge volume) calculated before the start of sulfur purging control are compared and sulfur purging control can be ended.

In accordance with this, the start timing of actual sulfur purging is detected not using a preset time but from oxygen concentration Co, and the end of sulfur purging is detected through the comparison of the total sulfur purging volume Spu with the cumulative sulfur adsorption volume Ss; accordingly, sufficient sulfur purging that can also respond suitably to variations in the concentration of sulfur in fuel can be achieved. In addition, the present invention can also compensate for variations in NOx occlusion ability occurring due to changes in the catalyst over time.

Figure 6:
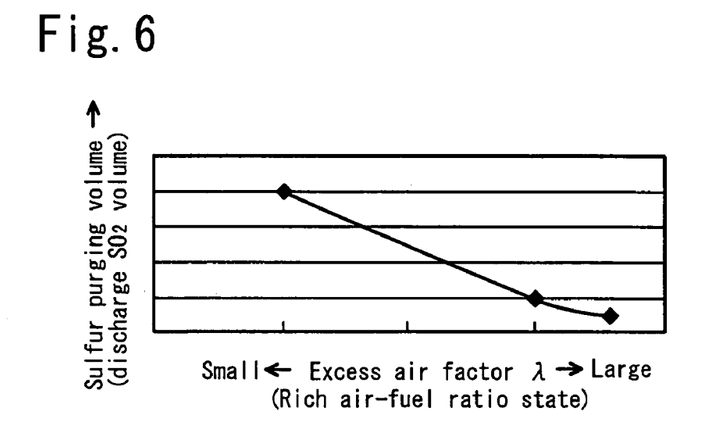
FIG. 6 shows the relationship between sulfur purging volume and excess air factor.
Figure 7:
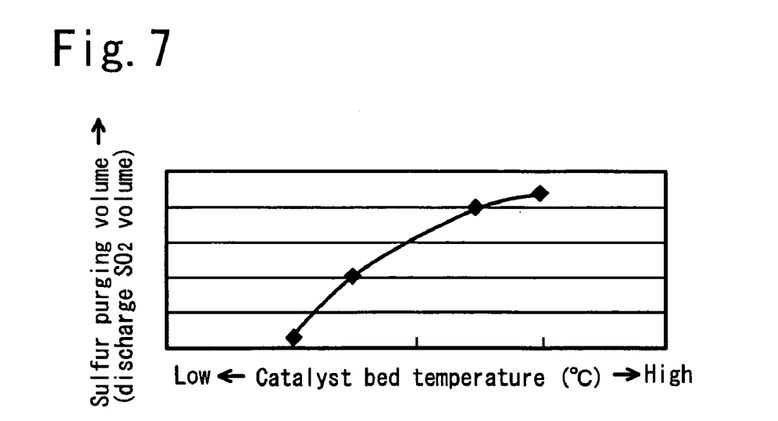
FIG. 7 shows the relationship between sulfur purging volume and catalyst head temperature.

In addition, by measuring various parameters such as S/V ratio, excess air factor λin, catalyst temperature Tn, it is possible to accurately calculate changes in the sulfur purging volume Sp. Consequently, accurate sulfur purging control can be carried out in accordance with the cumulative sulfur adsorption volume Ss from prior to the start of sulfur purging, and sulfur purging control can be minimized. Accordingly, heat aging of the catalyst can be minimized while avoiding any reduction in NOx purifying ratio occurring as a result of sulfur poisoning.

In the configuration explained above, although the exhaust gas purifying device 40 was explained as comprising a NOx occlusion reduction type catalyst 41 and a DPF 42, the present invention is also applicable when the exhaust gas purifying device is a stand-alone NOx occlusion reduction type catalyst; when the DPF is integrated with a NOx occlusion reduction type catalyst supported thereby; and when the NOx occlusion reduction type catalyst is combined not with a DPF but with a three-way filter, and the like.

What is claimed is:

1. An exhaust gas purifying method, using an exhaust gas purifying system for internal combustion engines providing with a NOx occlusion reduction type catalyst occluding NOx in the lean air-fuel ratio and discharging and reducing NOx in the rich air-fuel ratio, in which when it is judged that sulfur purging of said NOx occlusion reduction type catalyst is necessary, a sulfur purging control is performed by making the air-fuel ratio of the exhaust gas flowing in said NOx occlusion reduction type catalyst richer than that of the normal driving state of the internal combustion engines;

wherein, during sulfur purging control and following the start of said sulfur purging control, judging that sulfur purging has started when an oxygen concentration detected by an oxygen concentration detection means disposed in the downstream of said NOx occlusion reduction type catalyst drops below a predetermined judgment value set to determine timing of transition from a first predetermined oxygen concentration indicating an NOx discharge condition to a second predetermined oxygen concentration indicating that the NOx discharge has ended and indicating that an SOx discharge has started.

2. The exhaust gas purifying method of claim 1, wherein, during sulfur purging control, calculation of the volume of sulfur purged as a result of sulfur purging control is started at the point in time at which the sulfur purging is judged to have started, said purged sulfur volumes are summed to find the total sulfur purging volume, and the sulfur purging control is terminated in accordance with the result of comparison of said total sulfur purging volume with a target sulfur purging volume.

3. The exhaust gas purifying method of claim 2, wherein said target sulfur purging volume is the cumulative sulfur adsorption volume summed from prior to the start of sulfur purging.

4. The exhaust gas purifying method of claim 2, wherein the volume of sulfur purged as a result of sulfur purging control are converted into map data or functional equations using a S/V ratio, an air-fuel ratio or an excess air factor, and a catalyst temperature as parameters, and based on data input in advance, the volume of sulfur to be purged can be calculated using the S/V ratio, air-fuel ratio or an excess air factor, and catalyst temperature measured during the sulfur purging control.

5. An exhaust gas purifying system for internal combustion engines providing with a NOx occlusion reduction type catalyst occluding NOx in the lean air-fuel ratio and discharging and reducing NOx in the rich air-fuel ratio, and a control device, when it is judged that sulfur purging of said NOx occlusion reduction type catalyst is necessary, performing sulfur purging control by making the air-fuel ratio of the exhaust gas flowing in said NOx occlusion reduction type catalyst richer than that of the normal driving state of the internal combustion engine;

wherein in addition to providing an oxygen concentration sensor in the downstream of said NOx occlusion reduction type catalyst, during the sulfur purging control and following the start of said sulfur purging control, judging, by the control device, that sulfur purging has started when an oxygen concentration detected by an oxygen concentration detection means disposed in the downstream of the NOx occlusion reduction type catalyst drops below a predetermined judgment value set to determine timing of transition from a first predetermined oxygen concentration indicating an NOx discharge condition to a second predetermined oxygen concentration indicating that the NOx discharge condition has ended and indicating that an SOx discharge has started.

6. The exhaust gas purifying system of claim 5, wherein during sulfur purging control, said control device compares the total sulfur purging volume summed by the sulfur purging control starting summation following determination of the start of sulfur purging with the target purging volume, and terminates said sulfur purging control.

7. The exhaust gas purifying system of claim 6, wherein said target sulfur purging volume is the cumulative sulfur adsorption volume summed from prior to the start of sulfur purging.

8. The exhaust gas purifying system of claim 6, wherein during said sulfur purging control, said control device converts the volumes of sulfur purged as a result of sulfur purging control into map data or functional equations using a S/V ratio, an air-fuel ratio or an excess air factor, and a catalyst temperature as parameters, and based on data input in advance, calculates the volume of sulfur to be purged using the S/V ratio, air-fuel ratio or an excess air factor, and catalyst temperature measured during the sulfur purging control.

* * * * *